(12) United States Patent
Asensio et al.

(10) Patent No.: US 8,770,098 B2
(45) Date of Patent: Jul. 8, 2014

(54) DEVICE FOR CONTINUOUS PRODUCTION BY EXTRUSION COOKING OF A FOOD PRODUCT CONTAINING WHOLE SOLID PIECES, AND EXTRUSION MACHINE WITH SUCH A DEVICE

(75) Inventors: Luis Asensio, Savigneux (FR); Jean Marie Bouvier, Lyons (FR); Anne Perenon, Saint Cyr au Mont Dor (FR)

(73) Assignee: Clextral, Firminy (FR)

( * ) Notice: Subject to any disclaimer, the term of this patent is extended or adjusted under 35 U.S.C. 154(b) by 204 days.

(21) Appl. No.: 13/122,613

(22) PCT Filed: Sep. 25, 2009

(86) PCT No.: PCT/FR2009/051824
§ 371 (c)(1),
(2), (4) Date: Aug. 22, 2011

(87) PCT Pub. No.: WO2010/040929
PCT Pub. Date: Apr. 15, 2010

(65) Prior Publication Data
US 2011/0290122 A1 Dec. 1, 2011

(30) Foreign Application Priority Data
Oct. 6, 2008 (FR) .................................. 08 56743

(51) Int. Cl.
*A47J 37/12* (2006.01)
*A21B 7/00* (2006.01)
*G07F 9/10* (2006.01)

(52) U.S. Cl.
USPC ................................. 99/353; 99/348; 99/356

(58) Field of Classification Search
USPC .................... 99/323.8–323.11, 354, 356, 426, 99/443 R–443 C, 353, 348, 426 M; 426/279–284
See application file for complete search history.

(56) References Cited

U.S. PATENT DOCUMENTS 2,417,823 A * 3/1947 Hodson et al. ............. 198/467.1
3,765,811 A 10/1973 Sawada
(Continued)

FOREIGN PATENT DOCUMENTS

EP 0280484 A2 8/1988
FR 2123333 A 9/1972

OTHER PUBLICATIONS

International Search Report, dated May 4, 2010, from corresponding PCT application.

*Primary Examiner* — Tu B Hoang
*Assistant Examiner* — Michael Hoang
(74) *Attorney, Agent, or Firm* — Young & Thompson

(57) ABSTRACT

A device for continuous production by extrusion cooking of a co-extruded food product containing whole solid pieces, of the type including an extrusion die (20) provided with a contact face at the end of the outlet of a cylinder (11) of an extrusion machine (10) having at least one screw (13) for processing at least one starting material and driven in rotation within the cylinder. The extrusion die (20) is provided with a bore (23) for forming a continuous tubular string of the food product in a direction forming an angle with the axis of the extrusion machine (10). Directly at the outlet of the die (20) and in the axis of the bore (23) for forming the continuous string, the device includes elements (30) for directly incorporating at regular intervals the whole solid pieces (2) into the continuous string of food product without altering the initial dimensions thereof.

10 Claims, 3 Drawing Sheets

(56) References Cited

U.S. PATENT DOCUMENTS

| | | | |
|---|---|---|---|
| 4,416,910 A | * | 11/1983 | Hayashi et al. ............... 426/502 |
| 4,643,904 A | | 2/1987 | Brewer et al. |
| 4,687,429 A | | 8/1987 | Simelunas |
| 4,844,296 A | * | 7/1989 | Hayashi et al. ................... 222/1 |
| 4,854,842 A | * | 8/1989 | Kobayashi ................ 425/133.1 |
| 4,892,471 A | | 1/1990 | Baker et al. |
| 5,686,128 A | * | 11/1997 | Tracy et al. ................... 426/284 |
| 5,761,989 A | * | 6/1998 | Inakuma et al. ................ 99/386 |
| 6,607,763 B2 | * | 8/2003 | Geng et al. ...................... 426/94 |

* cited by examiner

DEVICE FOR CONTINUOUS PRODUCTION BY EXTRUSION COOKING OF A FOOD PRODUCT CONTAINING WHOLE SOLID PIECES, AND EXTRUSION MACHINE WITH SUCH A DEVICE

BACKGROUND OF THE INVENTION

This invention relates to a device for continuous production by extrusion cooking of a co-extruded food product containing whole solid pieces, such as for instance peanuts, cashew nuts, almonds, hazelnuts, or any other whole dried fruit or seed.

The invention also relates to an extrusion machine provided with such a device.

Co-extruded composite food products are known which include an outer wrapping made of a cooked cereal-based paste, and a liquid, half-liquid or pasty inner filling inserted in the middle of the outer wrapping.

For producing such products, it is known to make use of an extrusion machine conventionally including at least one screw driven in rotation inside a body having an elongated shape and performing adequate processing on the starting material via a series of steps, such as for instance mixing, pressing, shearing, and/or cooking.

The downstream end of the cylinder of the extrusion machine is provided with a die through which the food product is discharged from said extrusion machine.

The inner filling of the outer extruded wrapping is in general inserted by means of a pump into the tubular die for forming this outer wrapping.

This liquid or pasty filling, which can still be pumped, must not include solid particles, or else they are limited to very small particles embedded within the liquid or paste.

Known devices do not allow for bringing into the die large size whole pieces in the solid state thereof while maintaining integrity of the shape thereof.

Indeed, going through a pump and an injection cannula if the pieces are inside the stuffing or in the screws of the extrusion machine and in the die if the pieces are in the paste will lead to deterioration and crushing of the pieces. Also, the pieces are arranged in a completely random distribution and not in regular intervals inside the paste or stuffing.

SUMMARY OF THE INVENTION

The object of the invention is to solve this problem by proposing a device allowing for continuous production by extrusion cooking of a food product containing whole solid pieces, even without a stuffing, coating, or transfer product.

Thus, the object of the invention is a device for continuous production by extrusion cooking of a co-extruded food product containing whole solid pieces, of the type including an extrusion die provided with a contact face at an outlet end of an elongated cylinder of an extrusion machine including at least one screw for processing at least one starting material and driven in rotation within said cylinder, said extrusion die being fitted with a bore for forming a tubular continuous string of the food product in a direction forming an angle with the axis of the extrusion machine, characterized in that it comprises, directly at the outlet of the die and in the axis of the bore for forming the continuous string, means for directly incorporating at regular intervals said whole solid pieces into the continuous string of food product without altering the initial dimensions thereof.

According to other characteristics of the invention:

each piece has dimensions comprised between 2 and 30 mm, the ratio between the larger dimension and the smaller dimension of each piece is comprised between 1 and 8, the incorporating means are made of at least one transfer screw, arranged inside a tube and together with the tube creating cells for successively transporting the whole solid pieces, the incorporating means are made of two parallel transfer screws, arranged inside a tube and driven in rotation in the opposite direction to each other, said screws creating therebetween cells for successively transporting the whole solid pieces, the tube of said at least one transfer screw includes a first end provided with a longitudinal opening topped with a hopper for feeding the whole solid pieces and a second end provided with an axial outlet orifice of said pieces in the bore for forming the continuous string of food product, said at least one transfer screw is sized depending on the whole solid pieces so as to transport said pieces independently from each other, the throughput of the whole solid pieces at the axial outlet orifice of the tube is independent from the throughput of extruded material, the throughput of the whole solid pieces at the axial outlet orifice of the tube is adjustable by influencing the rotation speed of said at least one transfer screw, said at least one transfer screw consists of spring-loaded screws, the device comprises means for injecting a stuffing paste for making a co-extruded food product comprising an outer biscuit containing said whole solid pieces embedded in said stuffing paste, and the whole solid pieces are made of pieces, which are solid or semi-solid at ambient temperature, such as for instance dried fruit, e.g. grapes, peanuts, cashew nuts, almonds, hazelnuts, or any other whole dried fruit or seed, or else of pieces of cheese, dried meat, licorice, chocolate, or sweets.

Also an object of the invention is an extrusion machine for producing a food product containing whole solid pieces, of the type comprising at least one screw for processing at least one starting material arranged inside an elongated cylinder comprising an outlet end provided with a device as mentioned before.

BRIEF DESCRIPTION OF THE DRAWINGS

The invention and the advantages thereof will be better understood by reading the following description, provided as an example and referring to the appended drawings, wherein.

DESCRIPTION OF PREFERRED EMBODIMENTS

Figure 1:
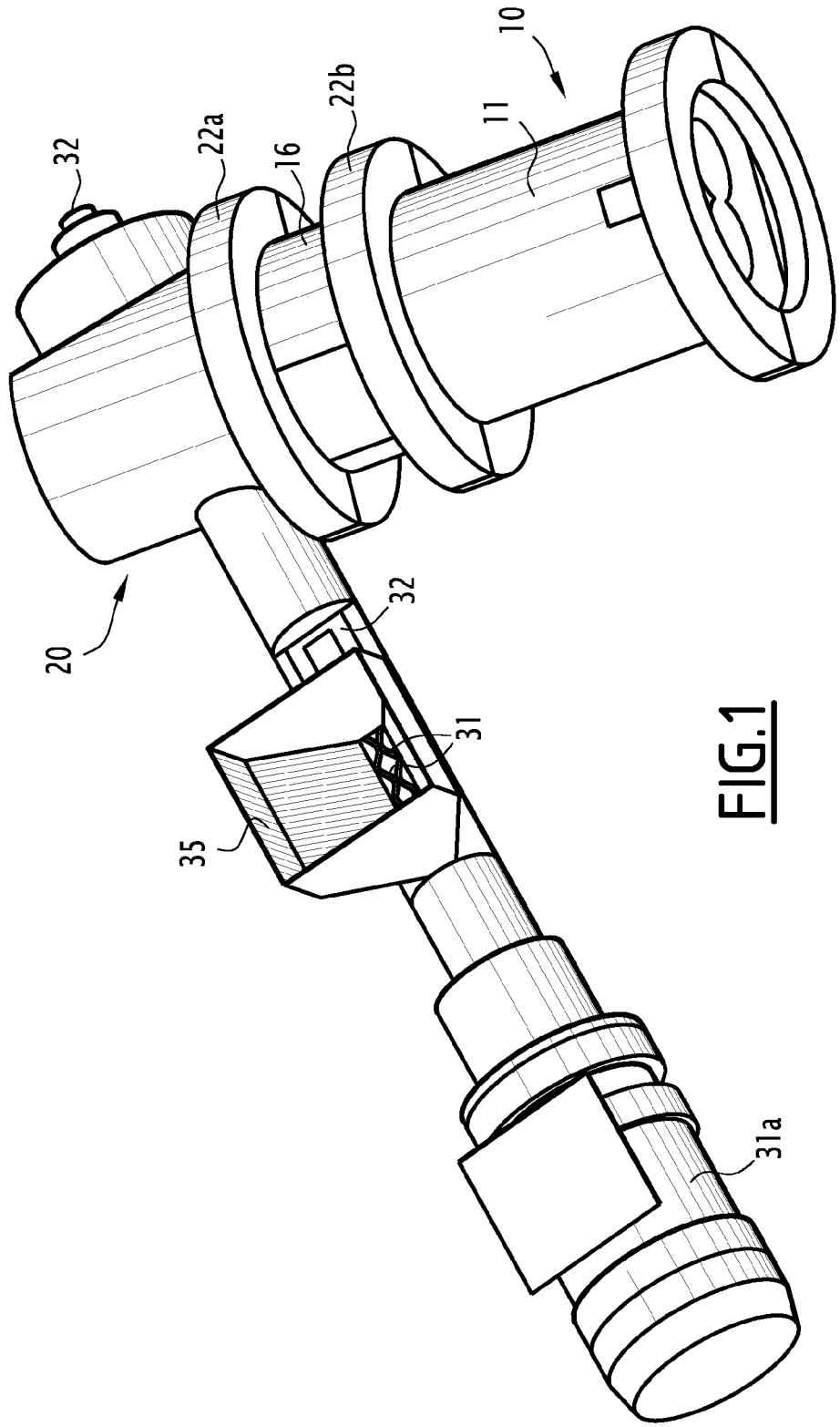
FIG. 1 is a schematic perspective view of a device for continuous production by extrusion cooking of a food product containing whole solid pieces, in accordance with the invention.
Figure 2:
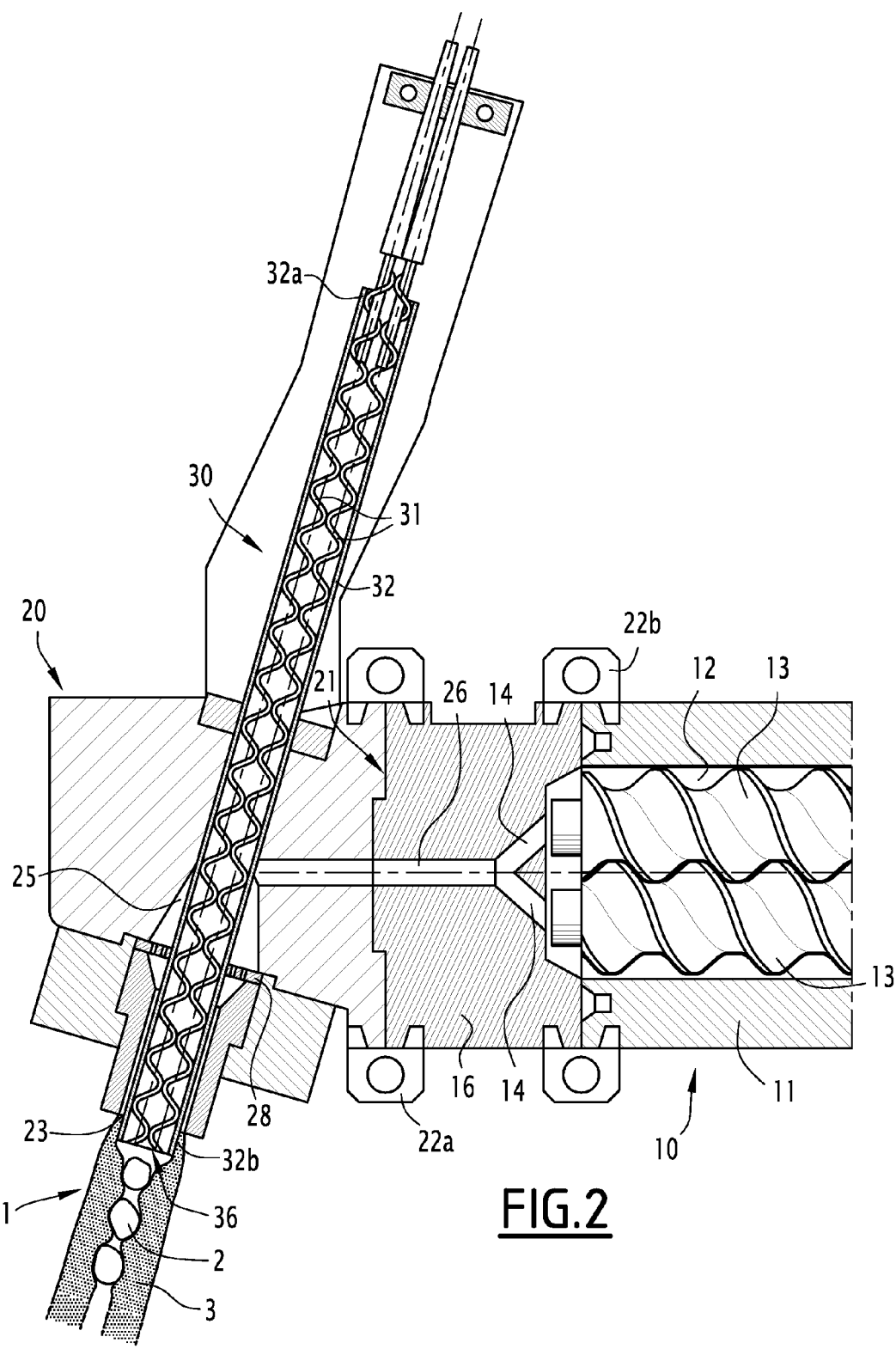
FIG. 2 is a schematic axial sectional view of the production device, in accordance with the invention.

FIGS. 1 and 2 schematically and partially show an extrusion machine globally designated by reference number 10 for the preparation of a food product 1 containing whole solid pieces 2 at regular intervals, arranged inside an outer wrapping 3 formed e.g. by a cereal-based cooked paste. Conventionally, the extrusion machine 10 comprises a hollow body, which has the shape of an elongated cylinder 11 and defines an inner chamber 12.

Inside this chamber 12, at least one rotating longitudinal process screw 13 is mounted, such as for instance for compressing, mixing and/or shearing of at least one e.g. cereal-based starting material. Said at least one screw 13 is coupled with known rotation driven means, not shown.

In the sample embodiment represented in the figures, the extrusion machine 10 is fitted inside the chamber 12 with two co-rotating and co-penetrating screws 13.

As shown in FIG. 2, the material is discharged from the extrusion machine as two flows through two outlet orifices 14.

The downstream outlet end of the cylinder 11 with respect to the direction of flow of the material is sealed by an adapter 16 joining the material flows of the two orifices 14 inside an outlet duct 26 through which the material is discharged after processing inside the chamber 12 of the cylinder 11 by means of the process screws 13.

At the food product outlet duct 26, this adapter 16 is provided with an extrusion die designated by the general reference number 20.

This extrusion die 20 is provided with a contact face 21 at the outlet end of the adapter 16 of the cylinder 11 and is fastened to this end e.g. via a flange 22a or via any other appropriate member of known type. The adapter 16 is fastened to the end of the cylinder 1 e.g. by means of a flange 22b or via any other means.

The extrusion die 20 is provided with a bore 23 for forming a continuous string of the food product 1 in a direction having an angle with respect to the axis of the extrusion machine 10, as shown in FIGS. 1 and 2.

For this purpose, the extrusion die 20 comprises an inner chamber 25 in communication with the outlet duct 26 arranged in the axis of said cylinder 11.

The inner chamber 25 is in communication with the bore 23, as shown in FIG. 2.

The inner chamber 25 may comprise a grid 28 in view of improving the orientation of the flow of the extruded material.

Directly at the outlet of the die 20 and in the axis of the bore 23 for forming the continuous string of the food product 1, the device for continuous production of the food product 1 containing whole solid pieces 2 comprises means 30 for directly incorporating at regular intervals said pieces 2 inside the outer wrapping 3 of the food product 1.

The pieces 2 incorporated within the outer wrapping 3 are identical with the pieces introduced at the input of the incorporating means 30 and do not undergo any alteration of the dimensions thereof.

These incorporating means are made of at least one transfer screw 31 and, preferably, two parallel and identical transfer screws 31.

According to one variant, the incorporating means 30 may be made of two transfer screws 31 ending in one transfer screw.

As shown in the figures, the incorporating means 30 are made of two parallel and identical transfer screws 31.

Figure 3:
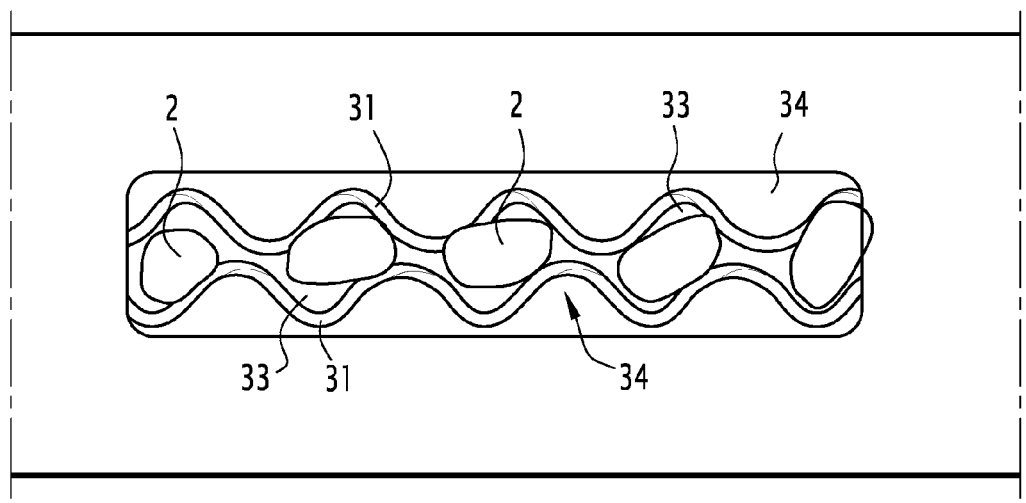
FIG. 3 is a schematic view of the screws for conveying whole solid pieces fitted to the production device, in accordance with the invention.

The transfer screws 31 are made of spring-loaded screws arranged inside a tube 32 and driven in rotation in the opposite direction to each other by a motor 31a (FIG. 1) of an adequate type. Such screws 31 will create therebetween cells 33 for successively transporting the whole solid pieces 2. The tube 32 of the transfer screws 31 comprises a first end 32a provided with a longitudinal opening 34 (FIG. 3) topped with a hopper 35 (FIG. 1) for feeding the pieces 2 and a second end 32b provided with an axial orifice 36 which directly opens at the food product outlet of the die 20.

The transfer screws 31 are sized depending on the whole solid pieces 2 so as to convey said pieces 2 independently from each other. The throughput of such pieces 2 at the axial outlet orifice 36 of the tube 32 is independent from the throughput of the extruded material and it can be set by influencing the rotating speed of said transfer screws 31.

The starting material, e.g. based on cereals, is inserted into the extrusion machine 10 where, inside the cylinder 11, it will undergo by means of said at least one screw 13 an appropriate mechanical action through a series of steps, such as for instance mixing, compressing, shearing and/or cooking.

The paste thus obtained at the outlet of the extrusion machine 20 is inserted into the outlet duct 26, then into the inner chamber 25 of the extrusion die 20.

This paste goes under high pressure into the bore 23 around the tube 32 so as to form at the outlet of the die 20, a continuous and tubular string extending in a direction having an angle with respect to the axis of the cylinder 11 of the extrusion machine.

The pieces 2 are poured into the hopper 35 and fill the cells 33 made between the screws 31 successively, and these pieces 2 are conveyed due to the rotation of the screws 31 in the opposite direction, into the tube 32 to the axial orifice 36.

The pieces 2 are successively placed at regular intervals into the continuous string so as to form the food product 1 consisting of the outer wrapping 3 and the whole solid pieces 2 distributed regularly therein.

The circuit for the paste, which consists of the extrusion machine 10, the outlet duct 26, and the bore 23, is independent from the circuit for the pieces 2, which consists of the transfer screw 31 and the tube 32.

In general, each piece 2 has dimensions comprised between 2 and 30 mm and the ratio between the larger dimension and the smaller dimension of each piece is comprised between 1 and 8.

These pieces 2, which are e.g. spherical or ovoid in shape, are solid or semi-solid at ambient temperature.

The pieces 2 meant for human or animal feeding are e.g. made of dried fruit, e.g. grapes, peanuts, cashew nuts, almonds, hazelnuts, or any other whole dried fruit or seed, or else of pieces of cheese, dried meat, licorice, chocolate, or sweets.

At the outlet of the die 20, the food product obtained can be expanded or not.

This food product, which has the shape of a tubular and extruded biscuit may be rolled and possibly cut after having left the die 20 so as to form small closed biscuit pads containing whole solid pieces. After rolling without cutting, these pads may then also be separated after initial hardening.

The food product at the outlet of the die can expand and close over the whole solid pieces by coating the same.

According to another embodiment, the device may be associated with means, such as for instance a pump, for injecting a stuffing paste for making a co-extruded food product comprising an outer biscuit containing said whole solid pieces embedded within said stuffing paste. The stuffing paste is e.g. a paste of chocolate with hazelnuts or a fruit paste with pieces of the same fruit. According to different embodiments, the stuffing paste may be injected at different locations depending on the viscosity of said paste, adhesion and size of the pieces, or else depending on other factors.

Thus, the stuffing may be inserted into said at least one transfer screw together with the pieces.

According to a variant, the stuffing paste is injected into said at least one transfer screw after the pieces have been inserted into this screw. The paste is injected, e.g. by a pump.

According to yet another variant, the stuffing paste is directly injected into the die of the extrusion machine by means of a cannula and a pump.

The device according to the invention allows with easy to implement and inexpensive means for the continuous production by extrusion cooking of a food product containing whole solid pieces.

The invention claimed is:

1. A continuous production, extrusion cooking device, the device preparing a co-extruded food product containing whole solid pieces, each having dimensions comprised between 2 and 30 mm, the device comprising:
   an extrusion cooking machine including an elongated cylinder within which at least one first screw is driven in rotation and that compresses and cooks at least one starting material, and an extrusion die having a face contacting an outlet of the elongated cylinder and a bore with a tube arranged along an axis of the bore, the extrusion cooking machine being arranged so that the at least one starting material goes under pressure into the bore and around the tube and expands at an outlet of the extrusion die so as to form a cooked continuous tubular string of the food product in a direction forming an angle with an axis of the extrusion machine; and
   at least one second screw arranged inside and along the axis of the tube so as to create with the tube, a plurality of cells that each encloses and transports an individual one of the whole solid pieces to an end of the tube, the end of the tube being provided with an axial outlet orifice for discharging individual ones of the solid whole pieces from the plurality of cells and directly incorporating individual ones of the whole solid pieces, at regular intervals and beyond the axial outlet orifice, inside the cooked continuous tubular string of the food product without altering the dimensions of the whole solid pieces.

2. The device according to claim 1, wherein said at least one second screw comprises two parallel transfer screws arranged inside the tube and driven in rotation in opposite directions, said two parallel transfer screws creating therebetween the cells for successively transporting the whole solid pieces.

3. The device according to claim 2, wherein a combined outer diameter of the two parallel transfer screws corresponds to an inner diameter of the tube and a combined inner diameter of the two parallel transfer screws corresponds to a largest of the dimensions of the whole solid pieces.

4. The device according to claim 1, wherein the tube comprises a longitudinal opening topped with a hopper for feeding the whole solid pieces.

5. The device according to claim 1, wherein said at least one second screw is arranged to convey the whole solid pieces independently from each other.

6. The device according to claim 1, wherein a rate of output of the whole solid pieces from the tube is independent of a rate of output of the at least one starting material.

7. The device according to claim 1, wherein a rate of output of the whole solid pieces from the tube is changed by changing a rotation speed of said at least one second screw.

8. The device according to claim 1, wherein said at least one second screw is a spring-loaded screw.

9. The device according to claim 1, further comprising means for injecting a stuffing paste for making the co-extruded food product comprising an outer biscuit containing said whole solid pieces embedded within said stuffing paste.

10. The device according to claim 1, wherein the whole solid pieces are solid or semi-solid at ambient temperature.

\* \* \* \* \*